(12) United States Patent
Krywaniuk

(10) Patent No.: US 8,468,589 B2
(45) Date of Patent: Jun. 18, 2013

(54) COMPUTERIZED SYSTEM AND METHOD FOR ADVANCED NETWORK CONTENT PROCESSING

(75) Inventor: Andrew Krywaniuk, Vancouver (CA)

(73) Assignee: Fortinet, Inc., Sunnyvale, CA (US)

( * ) Notice: Subject to any disclaimer, the term of this patent is extended or adjusted under 35 U.S.C. 154(b) by 973 days.

(21) Appl. No.: 11/331,030

(22) Filed: Jan. 13, 2006

(65) Prior Publication Data

US 2007/0169184 A1 Jul. 19, 2007

(51) Int. Cl.
*G06F 21/00* (2006.01)
(52) U.S. Cl.
USPC .............. 726/11; 726/10; 726/24; 713/150; 713/153; 455/406; 709/224
(58) Field of Classification Search
USPC ...................................... 726/11, 22
See application file for complete search history.

(56) References Cited

U.S. PATENT DOCUMENTS

| | | | | |
|---|---|---|---|---|
| 5,991,881 | A * | 11/1999 | Conklin et al. | 726/22 |
| 6,098,172 | A * | 8/2000 | Coss et al. | 726/11 |
| 6,108,782 | A * | 8/2000 | Fletcher et al. | 713/153 |
| 6,587,466 | B1 * | 7/2003 | Bhattacharya et al. | 370/395.21 |
| 7,237,008 | B1 * | 6/2007 | Tarbotton et al. | 709/206 |
| 7,310,815 | B2 * | 12/2007 | Yanovsky | 726/13 |
| 7,899,867 | B1 * | 3/2011 | Sherstinsky et al. | 709/206 |
| 8,189,576 | B2 * | 5/2012 | Ferguson et al. | 370/389 |
| 2003/0018726 | A1 * | 1/2003 | Low et al. | 709/206 |
| 2003/0145228 | A1 * | 7/2003 | Suuronen et al. | 713/201 |
| 2004/0093513 | A1 * | 5/2004 | Cantrell et al. | 713/201 |
| 2004/0162992 | A1 * | 8/2004 | Sami et al. | 713/200 |
| 2005/0039040 | A1 * | 2/2005 | Ransom et al. | 713/200 |
| 2005/0041656 | A1 * | 2/2005 | Dubois et al. | 370/389 |
| 2005/0108518 | A1 * | 5/2005 | Pandya | 713/151 |
| 2005/0132034 | A1 * | 6/2005 | Iglesia et al. | 709/223 |
| 2006/0037075 | A1 * | 2/2006 | Frattura et al. | 726/22 |
| 2006/0190997 | A1 * | 8/2006 | Mahajani et al. | 726/10 |
| 2006/0206935 | A1 * | 9/2006 | Choi et al. | 726/22 |

OTHER PUBLICATIONS

Mirkovic et al, A taxonomy of DDoS attack and DDoS defense mechanisms, Apr. 2004, ACM SIGCOMM Computer Communication Review, vol. 34, Issue 2, pp. 39-53.*
Apple, "About Safari International Domain Name support", http://support.apple.com/kb/TA22996?viewlocale=en_US, Mar. 21, 2005.*

* cited by examiner

*Primary Examiner* — Morshed Mehedi
(74) *Attorney, Agent, or Firm* — Hamilton, DeSanctis & Cha LLP

(57) ABSTRACT

A computerized system and method for processing network content in accordance with at least one content processing rule. In accordance with the inventive method, the network content is received at a first interface. The inventive system identifies a transmission protocol information of the received network content and uses the identified transmission protocol information to intercept at least a portion of the received network content formatted in accordance with a transmission protocol. The intercepted portion of the network content is redirected to a proxy, which buffers the redirected portion of network content. The buffered network content is scanned in accordance with a scanning criterion and processed in accordance with the at least one content processing rule based on the result of the scanning. The processed portion of network content may be forwarded using the second interface.

76 Claims, 4 Drawing Sheets

COMPUTERIZED SYSTEM AND METHOD FOR ADVANCED NETWORK CONTENT PROCESSING

FIELD OF THE INVENTION

The present invention generally relates to computer networks and more specifically to advanced network content processing and network usage monitoring.

DESCRIPTION OF THE RELATED ART

Security threats have evolved dramatically over the last 10 years, moving from network-level, connection-oriented attacks to application-level, agent-based attacks. Conventional networking devices (firewalls) can deal with network-level packet processing; for example, conventional firewalls can stop packets that do not come from a valid source, and VPN gateways can encrypt packets on the fly, making it safe for them to traverse the Internet. But today's critical network threats, like viruses and worms, are embedded in the application-level contents of packet streams. Enormous processing power is needed to detect and stop these application-layer threats by extracting the content from multiple packets, reconstructing the original content, and scanning it for the telltale signs of attacks or for inappropriate content. Additionally, businesses or service providers may be held liable for illegal or inappropriate content originating within their networks, or for failure to detect and prevent the distribution of such content.

To address these security challenges, modern firewalls must offer application-level content processing in real time—especially for real-time applications (like Web browsing) at today's (and tomorrow's) increasing network speeds.

A firewall is typically implemented as a hardware/software appliance having a number of physical networking interfaces for the incoming and outgoing network traffic. Network traffic enters one of these interfaces and, after filtering and other appropriate processing, is routed to a remote host typically attached to a different physical interface.

In a firewall, processing of network traffic is performed in accordance with a set of specific rules which are also called "firewall policies". The firewall policy dictates how the firewall should handle specific categories of network traffic, including, for example, network traffic associated with web browsing, email communications or telnet connections. Incoming traffic is matched against the rules in the list using traffic selectors as a key. Each firewall policy may specify one or more actions that the firewall must take for the specific category of network traffic. Exemplary rules include translating network addresses (NAT), requesting authentication, filtering banned words, blocking specific URLs, blocking transmission of specific file types, antivirus scans, blocking spam, logging, etc. The firewall policies collectively form a firewall configuration profile, which contains various parameters for configuring the firewall to process the network content. The firewall policies are usually created by the network administrator and are based on the information security policy of the respective organization.

Instant messaging and peer-to-peer protocols are becoming increasing common networking tools, both at home in the workplace. However, these new protocols may give rise to security vulnerabilities, both from new attacks and from user abuse. Unfortunately, existing firewalls are not well-suited to process content of instant messaging, peer-to-peer, e-mail, web browsing, and file sharing communications. Therefore, what is needed is a firewall system with an ability to effectively handle processing of content associated with instant messaging, peer-to-peer, e-mail, web browsing, and/or file sharing protocols.

SUMMARY OF THE INVENTION

The inventive methodology is directed to methods and systems that substantially obviate one or more of the above and other problems associated with conventional techniques for content processing for instant messaging, peer-to-peer, e-mail, web browsing, file sharing, and other networking protocols.

One aspect of the inventive concept is a method, computer programming product and a computerized system for processing network content in accordance with at least one content processing rule. In accordance with the inventive method, the network content is received at a first interface. The inventive system identifies a transmission protocol of the received network content and, if desired, intercepts at least a portion of the received network content formatted in accordance with a transmission protocol. The intercepted portion of the network content is redirected to a proxy, which buffers the redirected portion of network content. The buffered network content is scanned in accordance with a scanning criterion and processed in accordance with the at least one content processing rule based on the result of the scanning.

In accordance with a feature of the invention, the processed portion of network content may be forwarded using the same interface, which was used to receive the network traffic.

In accordance with another feature of the invention, at least one of the first and second interfaces are networking interfaces selected from a group consisting of a VLAN interface, a PPoE interface and an IPsec tunnel interface.

In accordance with another feature of the invention, the portion of the network content may be intercepted in the kernel.

In accordance with another feature of the invention, the proxy may be executing in the user space.

In accordance with another feature of the invention, the transmission protocol may be of instant messaging protocol type, peer-to-peer protocol type, e-mail protocol type, web browsing protocol type, file sharing protocol type and network news protocol type.

In accordance with yet another feature of the invention, the transmission protocol is selected from a group consisting of SMB protocol, AIM protocol, MSN messenger protocol, Yahoo messenger protocol, Skype protocol, FastTrack protocol, BEEP protocol, gnutella protocol, Avalanche protocol, BitTorrent protocol, SMTP protocol, POP3 protocol, IMAP protocol, HTTP protocol, FTP protocol, telnet protocol and NNTP protocol.

In accordance with yet another feature of the invention, the content processing includes content filtering and/or network monitoring.

In accordance with yet another feature of the invention, the content is scanned for malware. The scanning may be initiated prior to the completion of the buffering step. The scanning may be performed based on network connection information. Specifically, the network connection information may be used to identify a firewall policy applicable to the content. The connection information may include Internet Protocol (IP) address and/or the size of network content.

In accordance with yet another feature of the invention, the scanning is performed based on a data packet information.

In accordance with yet another feature of the invention, the scanning may include identifying unsolicited advertising in the portion of network content.

In accordance with yet another feature of the invention, the scanning may include identifying phrases in the portion of network content.

In accordance with yet another feature of the invention, the scanning may include identifying patterns in the portion of network content.

In accordance with yet another feature of the invention, the scanning may include determining whether the portion of network content comprises links to an external content, and, if so, verifying the external content.

In accordance with yet another feature of the invention, the scanning may include determining whether the portion of network content comprises an attachment, and, if so, buffering and scanning the attachment.

In accordance with a further feature of the invention, the processing may include rejecting the portion of network content.

In accordance with yet further feature of the invention, the processing may include delaying the portion of network content.

In accordance with a further feature of the invention, the processing may include altering the portion of network content.

Additional aspects related to the invention will be set forth in part in the description which follows, and in part will be obvious from the description, or may be learned by practice of the invention. Aspects of the invention may be realized and attained by means of the elements and combinations of various elements and aspects particularly pointed out in the following detailed description and the appended claims.

It is to be understood that both the foregoing and the following descriptions are exemplary and explanatory only and are not intended to limit the claimed invention or application thereof in any manner whatsoever.

BRIEF DESCRIPTION OF THE DRAWINGS

The accompanying drawings, which are incorporated in and constitute a part of this specification exemplify the embodiments of the present invention and, together with the description, serve to explain and illustrate principles of the inventive technique. Specifically.

DETAILED DESCRIPTION

In the following detailed description, reference will be made to the accompanying drawing(s), in which identical functional elements are designated with like numerals. The aforementioned accompanying drawings show by way of illustration, and not by way of limitation, specific embodiments and implementations consistent with principles of the present invention. These implementations are described in sufficient detail to enable those skilled in the art to practice the invention and it is to be understood that other implementations may be utilized and that structural changes and/or substitutions of various elements may be made without departing from the scope and spirit of present invention. The following detailed description is, therefore, not to be construed in a limited sense. Additionally, the various embodiments of the invention as described may be implemented in the form of a software running on a general purpose computer, in the form of a specialized hardware, or combination of software and hardware.

The inventor recognized that it would have been advantageous to devise a firewall system that provides advanced security services for instant messaging, peer-to-peer, e-mail, web browsing, file sharing, network news, as well as other communication protocols in addition to regular firewalling capabilities.

Figure 1:
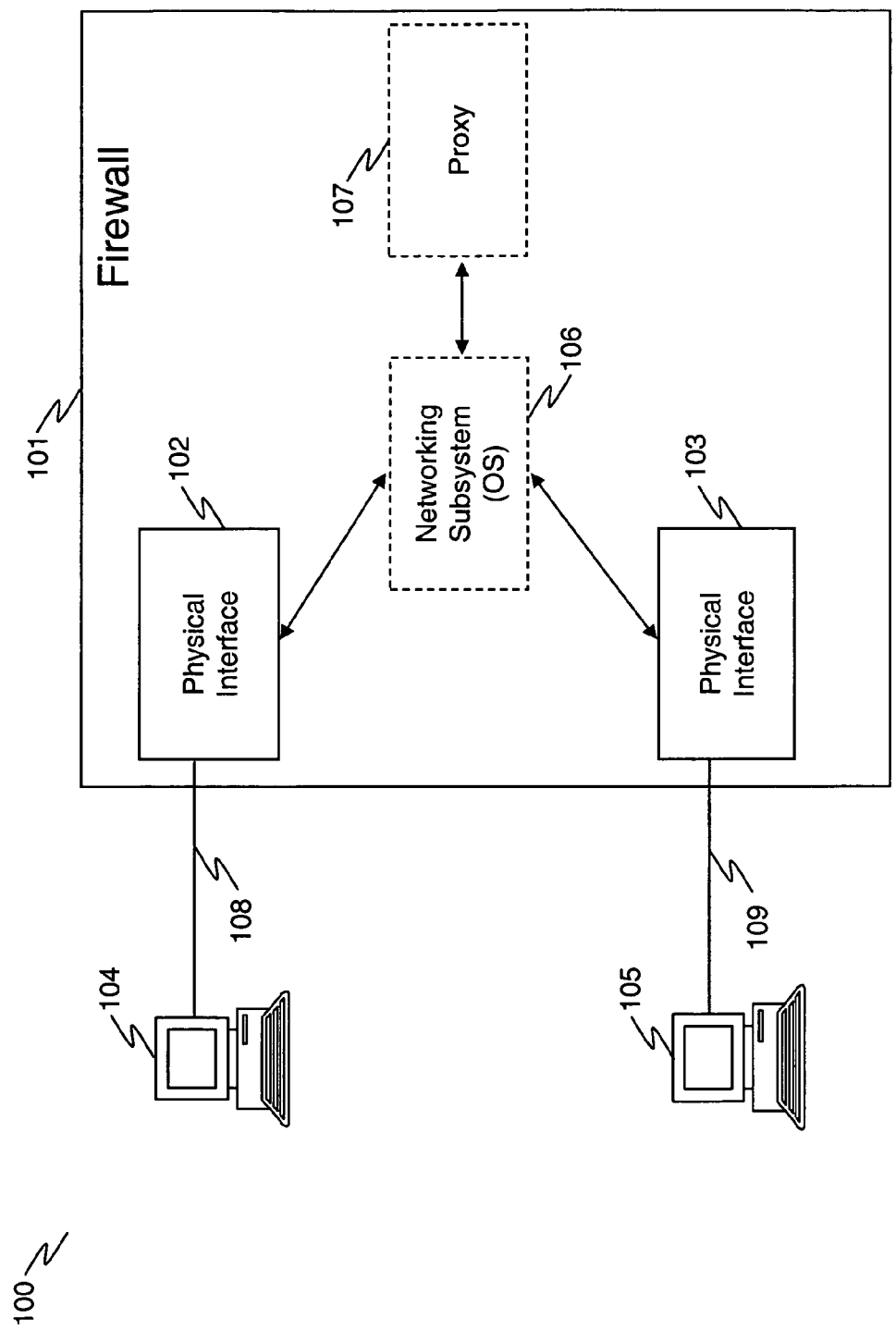
FIG. 1 depicts a conceptual block-diagram of a firewall system in accordance with an embodiment of the inventive concept.

FIG. 1 illustrates a topology of a firewall-protected network 100 in accordance with exemplary embodiment of the inventive concept. Two network entities 104 and 105 are connected to the opposite sides of a physical device (the firewall) 101, which monitors the network traffic 108, 109 passing between them. The firewall 101 may drop or alter some of this traffic based on a predefined set of rules. Therefore, the content of the network traffic 108 may not be identical to the content of the traffic 109. In practice, the two network entities 104 and 105 may be connected to the firewall 101 by either a direct link or through a routed network (not shown).

In one embodiment of the invention, the two network entities 104 and 105 are both client entities, such as user computer systems, for example user PCs, running a software program. In an alternative embodiment, one of the entities 104 and 105 is a client system and the other one is a server system. This embodiment generally corresponds to the systems utilizing instant messaging protocols (IM), wherein the network entities 104 and 105 would often be a client and a server. Specifically, the IM central server would relay messages from one client to a different client. Despite the fact that the IM communication takes place between two clients, the IM topology has all the attributes of the client-server model, because the connection scanned by the firewall is between the client and the IM central server. In yet another embodiment, both entities are servers.

As shown in FIG. 1, the firewall 101 is disposed within the network communication channel between the two user systems 104 and 105 and monitors network packet exchanges between them. As would be appreciated by those of skill in the art, for some well-known protocols, such as TCP, the transmitted network packets can be inspected for known threats or questionable content by one or more scanning engines. When a packet that matches one of the known signatures is detected, the inventive firewall system may generate a log message or set off an alarm, and the packet may be dropped. In one embodiment of the inventive system, upon detection of such a packet, the entire connection between the two users would be dropped as well.

As would be also appreciated by those of skill in the art, in many cases, the rules or signatures used to detect questionable data cannot be applied to individual packets. Streaming protocols, such as TCP, will break up data into smaller chunks during transmission, but the detection heuristics must be applied to the entire data stream rather than the individual packets. Therefore, in the inventive system, the data is first buffered by the firewall 101 in order to extract the data stream, and then the heuristic rules are be applied to this stream. To this end, in an embodiment of inventive firewall system, the intercepted packets are redirected by the networking subsystem 106 of the kernel of the firewall 101 to a user space application (proxy) 107 that builds and interprets the data buffer.

Additionally, an embodiment of the inventive system is configured to delay the transmission of the entire data stream until the full stream has passed all heuristic scanning. Because many protocols, such as TCP, rely on acknowledgement messages and other responses to control both transmission speed and retransmission of lost packets, the inventive firewall system acts to impersonate both sides of the connection by automatically generating these responses.

The firewall system shown in FIG. 1 includes physical network interfaces 102 and 103, and the aforesaid networking subsystem 106, which may be implemented as a part of the kernel of the operating system of the firewall appliance 101. Kernel-based implementation of the networking subsystem 106, as opposed to user-space implementation thereof is characterized by improved network traffic processing performance.

The networking subsystem 106 routes the packets between the physical interfaces 102 and 103 and transfers the data between various logical subsystems on the firewall system 101. Several types of stream-based data are intercepted by the networking subsystem 106 and buffered by a proxying module 107 for further processing. It should be noted that while FIG. 1 shows only physical interfaces, in another embodiment of the inventive firewall, one or both of the interfaces 102 and 103 may be implemented as logical interfaces.

The networking subsystem 106 may be configured to intercept data transmissions formatted in accordance with a set of networking protocols including, without limitation, SMB, IM protocols (e.g. AIM, MSN messenger, Yahoo messenger, Skype), P2P protocols (e.g. FastTrack, BEEP, gnutella, Avalanche, BitTorrent), as well as SMTP, POP3, IMAP, HTTP, FTP, telnet, NNTP, etc. The intercepted data packets are redirected to the proxy module 107 for re-assembly, inspection and further processing.

In one embodiment of the invention, the proxying module 107 is implemented in the kernel of the operating system of the firewall appliance 101. In an alternative embodiment, the proxy 107 is implemented in the form of an application executing in the userspace provided by the operating system of the firewall appliance 101. The proxying module 107 assembles the formatted packets intercepted by the networking subsystem 106 in accordance with the specification of the respective communication protocol to arrive at the transmission content. Depending on the specifics of the used communication protocol, an embodiment of the inventive system may provide for re-ordering of the data packets prior to, or during the transmission re-assembly.

Figure 2:
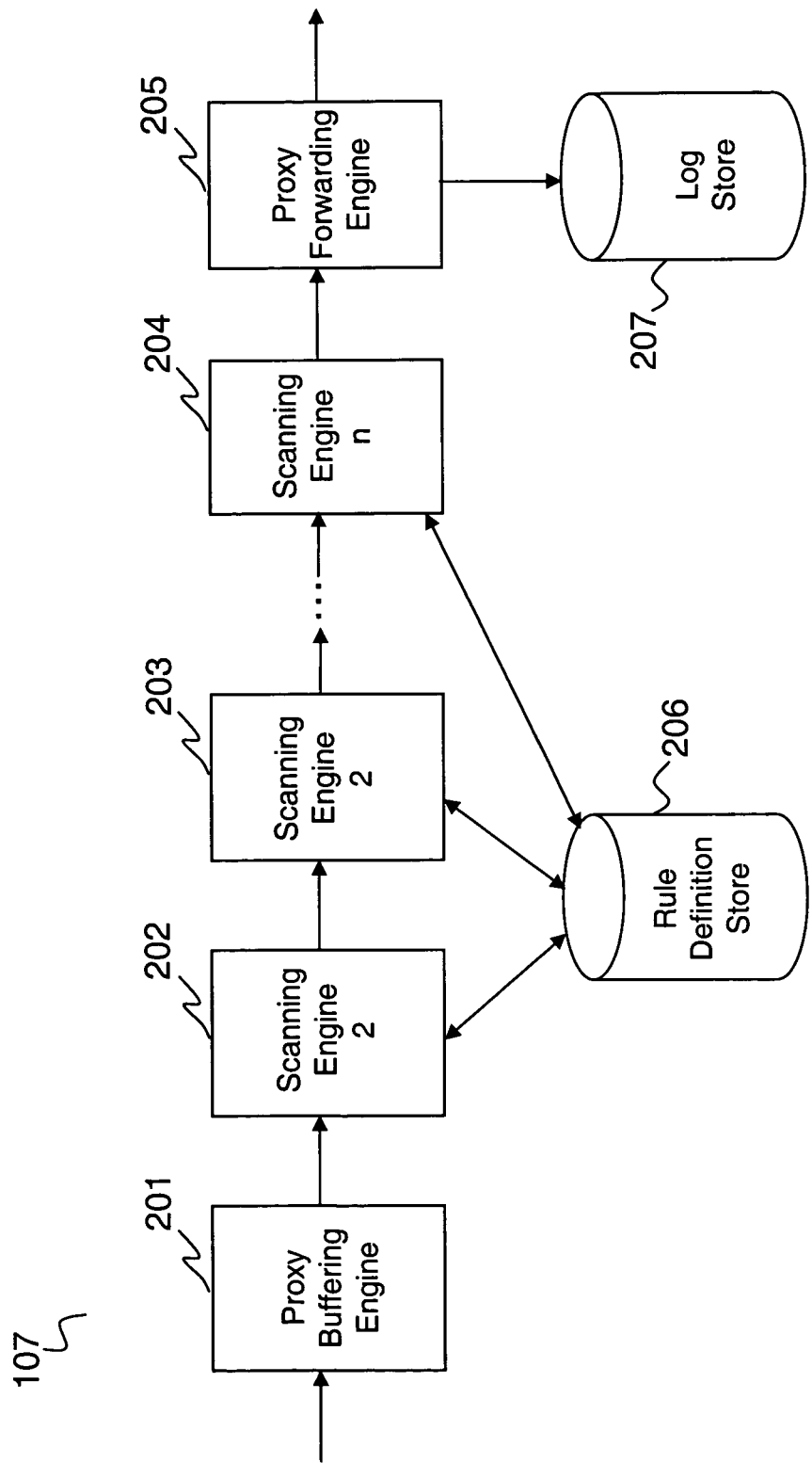
FIG. 2 depicts a conceptual block-diagram of an embodiment of inventive proxy module.

FIG. 2 illustrates an embodiment of the proxy module 107 of the inventive firewall 101. In the embodiment of the proxy shown in FIG. 2, when the entire data stream has been buffered and re-assembled in the proxy buffering engine 201, one or more scanning engines 202-204 of the proxy 107 process the transmission content according to a rule set. This rule set may be stored in a rule definition store 206. In one embodiment of the inventive system, the rules are chosen based on the network traffic selectors, such as source and destination IP address, port number, time of day, and possibly username (if it exists in the protocol). In another embodiment, the scanning operation may be initiated prior to the completion of the packet assembly step in order to decrease system latency.

The scanning engines 202-204 of the proxying module 107 may apply rules based on connection meta-information, such as the originating or destination IP address or network and/or the size of the data stream. For example, the scanning engines may be configured discard any data stream above a certain size, or accept/reject a connection from an IP address or a user that has been placed on a white or black list. The scanning engines 202-204 of the proxying module 107 may also apply additional rules based on the content of individual packets in order to detect specific attacks. Specifically, in an embodiment of the inventive system the scanning modules 202-204 are configured to detect buffer overflow conditions and/or malformed packets designed to trigger logic errors.

It should be noted that in the embodiment of FIG. 2, one set of the scanning engines 202-204 is associated with one proxying module comprised by elements 201 and 205. In an alternative embodiment of the inventive system, two or more separate proxy modules may share the same set of scanning engines. In other words, the inventive system may include multiple types of proxies and multiple types of scanning modules, and the data from two different types of proxies may be processed by the same scanning module.

In an embodiment of the invention, the proxying module 107 is not visible to network users. Therefore, the network users are not required to have any knowledge of its configuration. Specifically, the proxy module 107 may or may not use a different IP addresses for each side of the proxied connection. In one embodiment of the invention, the proxy 107 acts as network address translation system (NAT) translating IP addresses in the external network traffic into internal IP addresses of the private local area network. Furthermore, in another embodiment, the firewall device 101 is configured as the next hop router on the interface to which it is connected. In an alternative embodiment, the firewall 101 intercepts packets at layer 2 of the open system interconnect (OSI) network stack and buffers the data according to the same procedure.

In an embodiment of the invention, for protocols which predominantly carry a text stream, including e-mail, instant messaging, and web browsing protocols, actions performed by the scanning engines 202-204 of the proxy 107 may include, without limitation, scanning the data stream for unsolicited advertising (spam), phishing attempts and well-known online scams, as well as patterns or phrases relating to terrorism or criminal activities. Additionally or alternatively, the scanning engines 202-204 of the proxy 107 may be configured to detect apparent nonsensical messages that meet a heuristic test for probable stenographic content.

In another embodiment of the inventive firewall system, the scanning engines 202-204 of the proxy 107 may scan the network content for potentially libelous or offensive words or phrases, and either block or alter such content. For example, certain offensive words may be replaced with a string "* . . . *" or otherwise masked. Furthermore, the scanning engine may insert an administrative message into the data stream reminding a user associated with specific detected content of a corporate usage policy. Such a message may be inserted either proactively or in response to some triggering rule.

In yet another embodiment, the scanning engines 202-204 may scan for specific words or regular expressions within the data and either log or block them, or drop the associated connection entirely. For logging purposes, the proxying module 107 may include a log store 206, see FIG. 2. In cases where the protocol includes links to external content, such as HTTP uniform resource locator (URL) links, the scanning engines 202-204 may check the embedded links against stored white or black lists of links. As well known in the art, black list stores prohibited content, while in the white list configuration, all the content included in the white list is exempt from further processing. Alternatively, the embedded links may be authorized based on a request sent to an external server.

In the case of file transfer protocols, including, without limitation, peer-to-peer (P2P) protocols, file transfer protocol (FTP), SMB protocol, files transferred within IM protocols, as well as files transferred as e-mail attachments within POP3, SMTP or IMAP protocols, the contents of the transferred file are first buffered into memory or, alternatively, onto a disk. The scanning engines 202-204 then scan the content of the buffered file for various malware (viruses, worms, Trojans, spyware, etc.) or any other dangerous, inappropriate or illegal content. The scanning engines 202-204 may also scan for restricted content, including for example, probable stenographic messages embedded within pictures or data. If dangerous or inappropriate content is detected, the associated network connection is dropped or, alternatively, the inappropriate content is removed or replaced with an administrative message.

An embodiment of the inventive system archives files containing malware onto a disk or stores them in a log store 206 for later inspection or retrieval. Additionally or alternatively, the malware-infected content is submitted to a central server for further analysis. Yet alternatively, various statistical information or meta-data extracted from infected files can be aggregated and also submitted for subsequent detailed study.

The proxying module 107 may delay or even reject the transmission of a data stream to the destination network entity based on the output of the scanning engines 202-204. Additionally, the module 107 may cause the data stream to be archived, in whole or in part, to a disk, to the log store 206 or to a remote server, either automatically or based on the output of the scanning engines 202-204. Additionally, the proxying module 107 may require the network connection associated with a data stream flagged by any of the scanning engines 202-204 to be specifically authorized by an administrator, which can be accomplished in real time or otherwise.

In an alternative embodiment, the appropriate authorization may be requested from a remote authorization system, such as a Radius server, before the file or other content is allowed to reach its intended destination. Radius is an authentication protocol well known to persons of skill in the art. Specifics about Radius protocol may be found in RFC 2865 available from the Internet Society, http://www.rfcs.org. As it would be appreciated by persons of skill in the art, in addition to the aforementioned Radius protocol, the system may utilize suitable alternative protocols including, without limitation, TACACKS and Kerberos protocols, also well known in the art. Yet alternatively, the firewall 101 may force the network user to perform an additional authentication or authorization step(s) before allowing the connection to proceed. For example, the user may be required to confirm that he or she agrees with the terms of an appropriate license agreement.

In the case of point-to-point (P2P) file sharing protocols, various search keywords and search results obtained from the data stream by the scanning engines 202-204 may be archived in the log store 207. In an embodiment of the invention, the search results are filtered to exclude blacklisted sites or results matching specified regular expressions. In another embodiment, keyword searches matching specified criteria are blocked or logged and the frequency of searches or transfers by each user or IP address is rate-limited by the proxy engine 107. In yet further embodiment of the invention, signature-based scans are used to identify known content that is being distributed. In each case, the material may be archived to disk, log store or to a remote server, an event may be logged or an alarm raised, and the file transfer attempt may be blocked or the associated networking connection can be dropped.

In an embodiment of the inventive system 101, the rules to perform the scanning of transmissions formatted according to each of the aforementioned networking protocols are encoded in a generic format, such that they may be distributed from a central location, for example, a central rule store, and applied to various remote network security devices, such as firewall system 101, via network. To facilitate the efficient rule management and distribution, the inventive system may either itself include a central rule store and distribution server or access a shared server through network.

Furthermore, in another embodiment, the scanning rules used by the scanning engines 202-204 may be edited or customized by a local network administrator and securely redistributed to a subset of remote network security devices, via a network connection. Additionally, the network administrator may configure the inventive firewall system to apply only a subset of the automatically distributed rules, and/or he or she may configure the inventive system to apply different rule sets to network traffic matching specific criteria.

Figure 3:
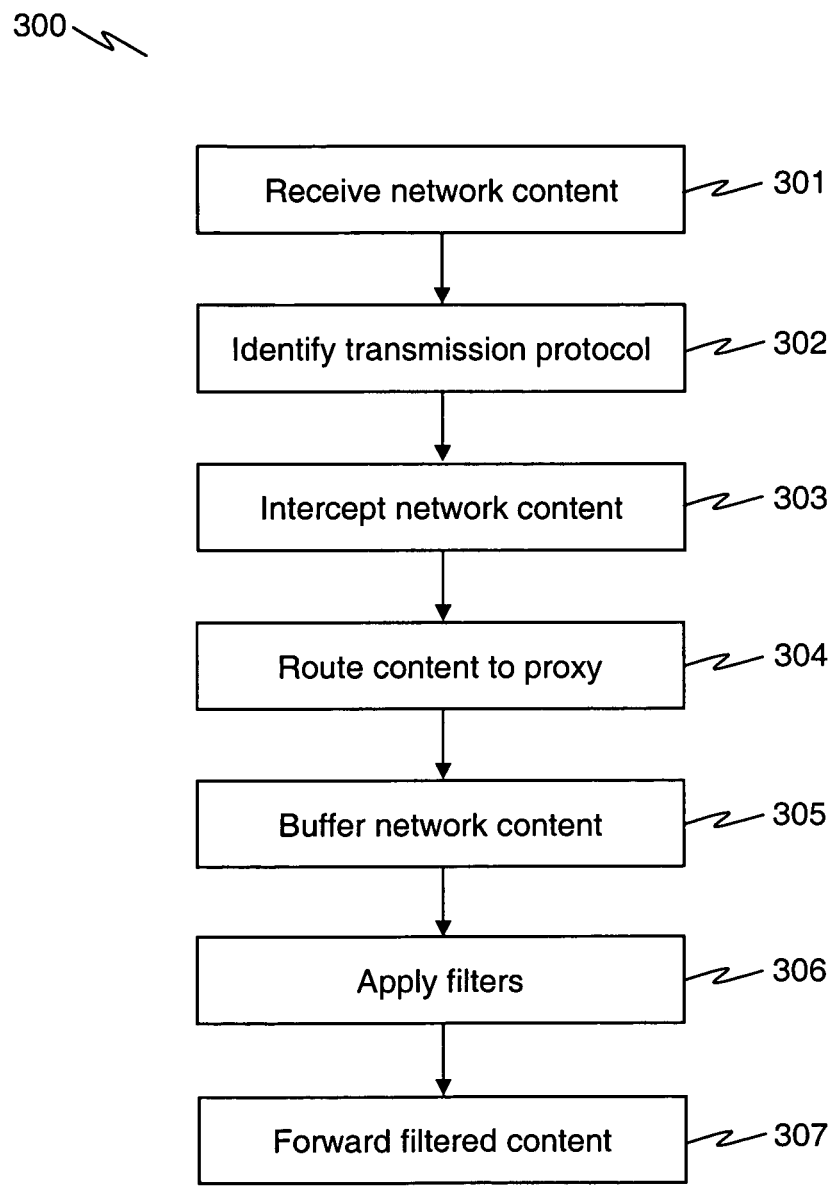
FIG. 3 illustrates an embodiment of inventive processing scheme.

FIG. 3 illustrates an embodiment of processing scheme associated with the inventive system 100. At step 301, the network data transmission is received by one of the physical interfaces 102 or 103. The system identifies the networking protocol associated with the received transmission at step 302 and, at step 303, intercepts network content corresponding to a specific protocol from a set of networking protocols.

As stated above, the protocols may include, without limitation, SMB, IM protocols (e.g. AIM, MSN messenger, Yahoo messenger, Skype), P2P protocols (e.g. FastTrack, BEEP, gnutella, Avalanche, BitTorrent), as well as SMTP, POP3, IMAP, HTTP, FTP, telnet, etc. The intercepted data packets are redirected to the proxy module 107 for re-assembly, inspection and further processing, see step 304.

At step 305, the network data stream is buffered by the proxy 107. At step 306, the content filters and/or monitors are applied to the re-assembled transmission content by the scanning engines 202-204. After the content of the network transmission has been scanned by the scanning module of the proxy 107, and, if appropriate, filtered, analyzed, logged or modified in accordance with the aforesaid set of rules, the network transmission content is re-encoded in accordance with the original networking protocol and forwarded to its original destination by one of the physical interfaces 102 or 103, see FIG. 3, step 307.

Figure 4:
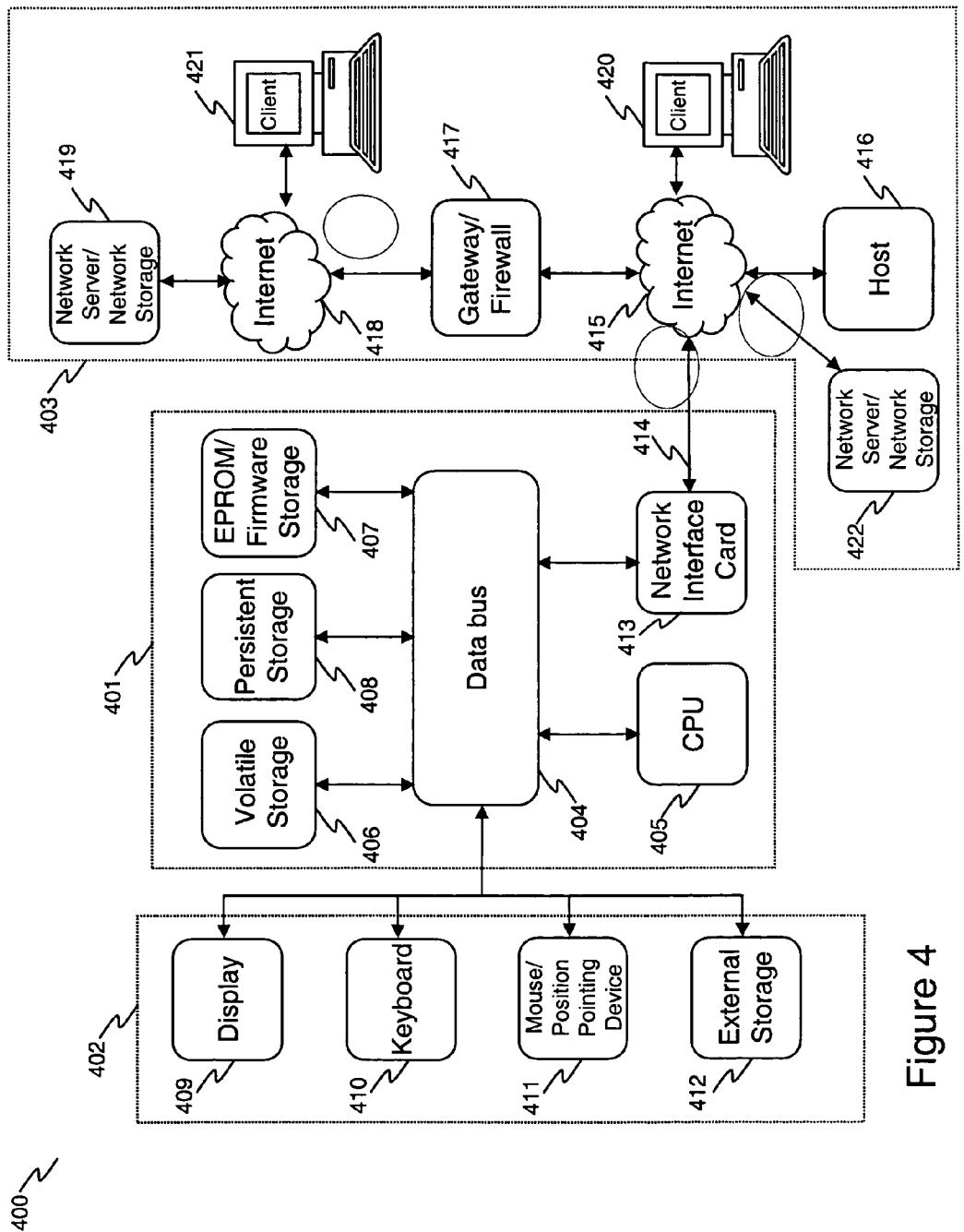
FIG. 4 illustrates an exemplary embodiment of a computer platform upon which the inventive firewall system may be implemented.

The hardware platform of the present invention will now be described. FIG. 4 is a block diagram that illustrates an embodiment of a computer platform 400 upon which an embodiment of the inventive methodology may be implemented. The system 400 includes a computer/server platform 401, peripheral devices 402 and network resources 403.

The computer platform 401 may include a data bus 404 or other communication mechanism for communicating information across and among various parts of the computer platform 401, and a processor 405 coupled with bus 401 for processing information and performing other computational and control tasks. Computer platform 401 also includes a volatile storage 406, such as a random access memory (RAM) or other dynamic storage device, coupled to bus 404 for storing various information as well as instructions to be executed by processor 405. The volatile storage 406 also may be used for storing temporary variables or other intermediate information during execution of instructions by processor 405. Computer platform 401 may further include a read only memory (ROM or EPROM) 407 or other static storage device coupled to bus 404 for storing static information and instructions for processor 405, such as basic input-output system (BIOS), as well as various system configuration parameters. A persistent storage device 408, such as a magnetic disk, optical disk, or solid-state flash memory device is provided and coupled to bus 401 for storing information and instructions.

Computer platform 401 may be coupled via bus 404 to a display 409, such as a cathode ray tube (CRT), plasma display, or a liquid crystal display (LCD), for displaying information to a system administrator or user of the computer platform 401. An input device 410, including alphanumeric and other keys, is coupled to bus 401 for communicating information and command selections to processor 405. Another type of user input device is cursor control device 411, such as a mouse, a trackball, or cursor direction keys for communicating direction information and command selections to processor 404 and for controlling cursor movement on display 409. This input device typically has two degrees of freedom in two axes, a first axis (e.g., x) and a second axis (e.g., y), that allows the device to specify positions in a plane.

An external storage device 412 may be connected to the computer platform 401 via bus 404 to provide an extra or removable storage capacity for the computer platform 401. In an embodiment of the computer system 400, the external removable storage device 412 may be used to facilitate exchange of data with other computer systems.

The invention is related to the use of computer system 400 for implementing the techniques described herein. In an embodiment, the inventive firewall system 101 may reside on a machine such as computer platform 401. According to one embodiment of the invention, the techniques described herein are performed by computer system 400 in response to processor 405 executing one or more sequences of one or more instructions contained in the volatile memory 406. Such instructions may be read into volatile memory 406 from another computer-readable medium, such as persistent storage device 408. Execution of the sequences of instructions contained in the volatile memory 406 causes processor 405 to perform the process steps described herein. In alternative embodiments, hard-wired circuitry may be used in place of or in combination with software instructions to implement the invention. Thus, embodiments of the invention are not limited to any specific combination of hardware circuitry and software.

The term "computer-readable medium" as used herein refers to any medium that participates in providing instructions to processor 405 for execution. The computer-readable medium is just one example of a machine-readable medium, which may carry instructions for implementing any of the methods and/or techniques described herein. Such a medium may take many forms, including but not limited to, non-volatile media, volatile media, and transmission media. Non-volatile media includes, for example, optical or magnetic disks, such as storage device 408. Volatile media includes dynamic memory, such as volatile storage 406. Transmission media includes coaxial cables, copper wire and fiber optics, including the wires that comprise data bus 404. Transmission media can also take the form of acoustic or light waves, such as those generated during radio-wave and infra-red data communications.

Common forms of computer-readable media include, for example, a floppy disk, a flexible disk, hard disk, magnetic tape, or any other magnetic medium, a CD-ROM, any other optical medium, punchcards, papertape, any other physical medium with patterns of holes, a RAM, a PROM, an EPROM, a FLASH-EPROM, a flash drive, a memory card, any other memory chip or cartridge, a carrier wave as described hereinafter, or any other medium from which a computer can read.

Various forms of computer readable media may be involved in carrying one or more sequences of one or more instructions to processor 405 for execution. For example, the instructions may initially be carried on a magnetic disk from a remote computer. Alternatively, a remote computer can load the instructions into its dynamic memory and send the instructions over a telephone line using a modem. A modem local to computer system 400 can receive the data on the telephone line and use an infra-red transmitter to convert the data to an infra-red signal. An infra-red detector can receive the data carried in the infra-red signal and appropriate circuitry can place the data on the data bus 404. The bus 404 carries the data to the volatile storage 406, from which processor 405 retrieves and executes the instructions. The instructions received by the volatile memory 406 may optionally be stored on persistent storage device 408 either before or after execution by processor 405. The instructions may also be downloaded into the computer platform 401 via Internet using a variety of network data communication protocols well known in the art.

The computer platform 401 also includes a communication interface, such as network interface card 413 coupled to the data bus 404. Communication interface 413 provides a two-way data communication coupling to a network link 414 that is connected to a local network 415. For example, communication interface 413 may be an integrated services digital network (ISDN) card or a modem to provide a data communication connection to a corresponding type of telephone line. As another example, communication interface 413 may be a local area network interface card (LAN NIC) to provide a data communication connection to a compatible LAN. Wireless links, such as well-known 802.11a, 802.11b, 802.11g and Bluetooth may also used for network implementation. In any such implementation, communication interface 413 sends and receives electrical, electromagnetic or optical signals that carry digital data streams representing various types of information.

Network link 413 typically provides data communication through one or more networks to other network resources. For example, network link 414 may provide a connection through local network 415 to a host computer 416, or a network storage/server 417. Additionally or alternatively, the network link 413 may connect through gateway/firewall 417 to the wide-area or global network 418, such as an Internet. Thus, the computer platform 401 can access network resources located anywhere on the Internet 418, such as a remote network storage/server 419. On the other hand, the computer platform 401 may also be accessed by clients located anywhere on the local area network 415 and/or the Internet 418. The network clients 420 and 421 may themselves be implemented based on the computer platform similar to the platform 401.

Local network 415 and the Internet 418 both use electrical, electromagnetic or optical signals that carry digital data streams. The signals through the various networks and the signals on network link 414 and through communication interface 413, which carry the digital data to and from computer platform 401, are exemplary forms of carrier waves transporting the information.

Computer platform 401 can send messages and receive data, including program code, through the variety of network(s) including Internet 418 and LAN 415, network link 414 and communication interface 413. In the Internet example, when the system 401 acts as a network server, it might transmit a requested code or data for an application program running on client(s) 420 and/or 421 through Internet 418, gateway/firewall 417, local area network 415 and communication interface 413. Similarly, it may receive code from other network resources.

The received code may be executed by processor 405 as it is received, and/or stored in persistent or volatile storage devices 408 and 406, respectively, or other non-volatile storage for later execution. In this manner, computer system 401 may obtain application code in the form of a carrier wave.

It should be noted that the present invention is not limited to any specific firewall system. The inventive policy-based content processing system may be used in any firewall operating modes, including, without limitation, Network Address Translation (NAT), routed and transparent modes.

Finally, it should be understood that processes and techniques described herein are not inherently related to any particular apparatus and may be implemented by any suitable combination of components. Further, various types of general purpose devices may be used in accordance with the teachings described herein. It may also prove advantageous to construct specialized apparatus to perform the method steps described herein. The present invention has been described in relation to particular examples, which are intended in all respects to be illustrative rather than restrictive. Those skilled in the art will appreciate that many different combinations of hardware, software, and firmware will be suitable for practicing the present invention. For example, the described software may be implemented in a wide variety of programming or scripting languages, such as Assembler, C/C++, perl, shell, PHP, Java, etc.

Moreover, other implementations of the invention will be apparent to those skilled in the art from consideration of the specification and practice of the invention disclosed herein. Various aspects and/or components of the described embodiments may be used singly or in any combination in the computerized network content processing system. It is intended that the specification and examples be considered as exemplary only, with a true scope and spirit of the invention being indicated by the following claims.

What is claimed is:

1. A computer-implemented method comprising:
    receiving a plurality of packets at a first interface of a multi-purpose network protection firewall device including one or more processors and a memory;
    identifying a transmission protocol according to which network content distributed among a subset of packets of the plurality of packets is formatted as an instant messaging (IM) protocol;
    using information regarding the identified transmission protocol to redirect the subset of packets to a proxy module integrated within the multi-purpose protection firewall device;
    extracting the network content from the subset of packets and buffering at least a portion of the network content by the proxy module;
    processing, by the proxy module, the buffered portion of the network content in accordance with at least one content processing rule selected from a plurality of content processing rules based on the identified transmission protocol;
    identifying a second transmission protocol according to which network content distributed among a second subset of packets of the plurality of packets is formatted;
    using information regarding the identified second transmission protocol to redirect the second subset of packets to a second proxy module integrated within the multi-purpose protection firewall device;
    wherein the second transmission protocol is distinct from the transmission protocol;
    wherein the processing comprises filtering the buffered portion of the network content;
    wherein the plurality of content processing rules includes one or more content filtering rules; and
    wherein the proxy module is implemented at least in part by the one or more processors and the memory, the memory having instructions tangibly embodied therein representing at least a portion of the proxy module that are executable by the one or more processors.

2. The computer-implemented method of claim 1, wherein an additional content processing rule is selected from the plurality of content processing rules based on traffic selectors associated with the network content.

3. The computer-implemented method of claim 1, further comprising forwarding the processed portion of the network content to a destination using a second interface.

4. The computer-implemented method of claim 3, wherein at least one of the first and second interfaces are networking interfaces selected from a group consisting of a Virtual Local Area Network (VLAN) interface, a Point-to-Point Protocol over Ethernet (PPPoE) interface and an Internet Protocol Security (IPsec) tunnel interface.

5. The computer-implemented method of claim 1, further comprising:
    identifying a second transmission protocol according to which network content distributed among a second subset of packets of the plurality of packets is formatted;
    using information regarding the identified second transmission protocol to redirect the second subset of packets to a second proxy module integrated within the multi-purpose network protection firewall device; and
    wherein the second transmission protocol is the (IM) protocol, another (IM) protocol type, a peer-to-peer protocol type, an e-mail protocol type, a web browsing protocol type, a file sharing protocol type or a network news protocol type.

6. The computer-implemented method of claim 1, further comprising:
    identifying a second transmission protocol according to which network content distributed among a second subset of packets of the plurality of packets is formatted;
    using information regarding the identified second transmission protocol to redirect the second subset of packets to a second proxy module integrated within the multi-purpose protection firewall device; and
    wherein the second transmission protocol is Simple Mail Transfer Protocol (SMTP), Post Office Protocol (POP), Internet Message Access Protocol (IMAP), Hypertext Transfer Protocol (HTTP), File Transfer Protocol (FTP) or telnet protocol.

7. The computer-implemented method of claim 5, further comprising anti-malware scanning of network content distributed among the second subset of packets.

8. The computer-implemented method of claim 5, further comprising scanning network content distributed among the second subset of packets for unsolicited advertising in accordance with at least one scanning criterion.

9. The computer-implemented method of claim 5, further comprising scanning network content distributed among the second subset of packets for phishing attempts in accordance with at least one scanning criterion.

10. The computer-implemented method of claim 5, further comprising scanning network content distributed among the second subset of packets for patterns relating to terrorism or criminal activities in accordance with at least one scanning criterion.

11. The computer-implemented method of claim 5, further comprising detecting at least one nonsensical message within network content distributed among the second subset of packets.

12. The computer-implemented method of claim 1, wherein the processing comprises scanning the buffered portion of the network content for at least one predetermined word.

13. The computer-implemented method of claim 1, wherein the processing comprises scanning the buffered portion of the network content in accordance with at least one scanning criterion.

14. The computer-implemented method of claim 13, wherein the processing further comprises blocking content that has been identified during the scanning operation.

15. The computer-implemented method of claim 13, wherein the processing further comprises inserting an administrative message into content that has been identified during the scanning operation.

16. The computer-implemented method of claim 13, wherein the processing further comprises logging content that has been identified during the scanning operation.

17. The computer-implemented method of claim 13, wherein the processing further comprises altering content that has been identified during the scanning operation.

18. The computer-implemented method of claim 17, wherein altering comprises masking content that has been identified during the scanning operation.

19. The computer-implemented method of claim 13, wherein the processing further comprises dropping a network connection associated with content that has been identified during the scanning operation.

20. The computer-implemented method of claim 13, wherein the processing further comprises delaying content that has been identified during the scanning operation.

21. The computer-implemented method of claim 13, wherein the processing further comprises archiving content that has been identified during the scanning operation.

22. The computer-implemented method of claim 13, wherein processing comprises generating at least one alert based on content that has been identified during the scanning operation.

23. The computer-implemented method of claim 13, wherein processing comprises performing an authentication operation based on content that has been identified during the scanning operation.

24. The computer-implemented method of claim 13, wherein the at least one scanning criterion is selected from a plurality of scanning criteria based on connection information associated with the network content and wherein the connection information comprises at least one of a group consisting of the identified transmission protocol, a source Internet Protocol (IP) address, a destination IP address, a source port number, a destination port number, a source firewall interface, a destination firewall interface, a size of the network content, a date, a time of day and authentication information.

25. The computer-implemented method of claim 13, wherein at least one scanning criterion is selected from a plurality of scanning criteria based on a data packet information.

26. The computer-implemented method of claim 13, wherein the scanning comprises identifying phrases in the buffered portion of network content.

27. The computer-implemented method of claim 13, wherein the scanning comprises identifying regular expressions in the buffered portion of the network content.

28. The computer-implemented method of claim 13, wherein the scanning comprises identifying patterns in the buffered portion of the network content.

29. The computer-implemented method of claim 13, wherein scanning comprises determining whether the buffered portion of the network content comprises a link to external content, and, if so, verifying the external content.

30. The computer-implemented method of claim 29, wherein verifying comprises checking the link against a white list of links or a black list of links.

31. The computer-implemented method of claim 29, wherein verifying comprises authorizing the external content based on a request sent to an external server.

32. The computer-implemented method of claim 13, wherein scanning comprises determining whether the buffered portion of the network content comprises an attachment, and, if so, buffering and scanning the attachment.

33. The computer-implemented method of claim 1, wherein processing comprises performing statistical analysis on the buffered portion of the network content.

34. The computer-implemented method of claim 1, wherein the processing comprises network usage monitoring in relation to usage by authorized users.

35. The computer-implemented method of claim 1, wherein the processing is initiated prior to the completion of the buffering.

36. A multi-purpose network protection firewall device comprising:
   a first interface operable to receive a plurality of packets formatted in accordance with a plurality of transmission protocols;
   a plurality of proxy module coupled in communication with the first interface;
   a networking subsystem, coupled in communication with the proxy module, operable to:
   identify a transmission protocol of the plurality of transmission protocols according to which network content distributed among a subset of packets of the plurality of packets is formatted as an instant messaging (IM) protocol, redirect the subset of packets to the proxy module;
   identify a second transmission protocol according to which network content distributed among a second subset of packets of the plurality of packets is formatted; and
   use information regarding the identified second transmission protocol to redirect the second subset of packets to a second proxy module integrated within the multi-purpose network protection firewall device;
   wherein the second transmission protocol is distinct from the transmission protocol;
   wherein the proxy is operable to scan the buffered portion of the network content in accordance with at least one scanning criterion;
   wherein the proxy module is configured to extract the network content from the subset of packets, buffer at least a portion of the network content, and process the buffered portion of the network content in accordance with the at least one content processing rule selected from a plurality of content processing rules based on the identified transmission protocol; and
   wherein the plurality of content processing rules includes one or more content filtering rules.

37. The multi-purpose network protection firewall device of claim 36, wherein the proxy module further comprises:
   a proxy buffering engine operable to buffer the portion of the network content;
   at least one scanning engine operable to process the buffered portion of the network content in accordance with the at least one content processing rule; and a proxy forwarding engine operable to forward the processed portion of the network content to a second interface.

38. The multi-purpose network protection firewall device of claim 36, further comprising a rule server operable to provide the at least one content processing rule to the proxy module via a network.

39. The multi-purpose network protection firewall device of claim 36, further comprising a log server operable to log the buffered portion of the network content.

40. The multi-purpose network protection firewall device of claim 36, wherein an additional content processing rule is selected from the plurality of content processing rules based on traffic selectors associated with the network content.

41. The multi-purpose network protection firewall device of claim 36, further comprising a second interface operable to forward the processed portion of the network content to a destination.

42. The multi-purpose network protection firewall device of claim 41, wherein at least one of the first and second interfaces are networking interfaces selected from a group consisting of a Virtual Local Area Network (VLAN) interface, a Point-to-Point Protocol over Ethernet (PPPoE) interface and an Internet Protocol Security (IPsec) tunnel interface.

43. The multi-purpose network protection firewall device of claim 36, wherein the networking subsystem is further operable to:
 identify a second transmission protocol according to which network content distributed among a second subset of packets of the plurality of packets is formatted;
 use information regarding the identified second transmission protocol to redirect the second subset of packets to a second proxy module integrated within the multi-purpose network protection firewall device; and
 wherein the second transmission protocol is the (IM) protocol, another instant messaging protocol type, a peer-to-peer protocol type, an e-mail protocol type, a web browsing protocol type, or a file sharing protocol type.

44. The multi-purpose network protection firewall device of claim 36, wherein the networking subsystem is further operable to:
 identify a second transmission protocol according to which network content distributed among a second subset of packets of the plurality of packets is formatted;
 use information regarding the identified second transmission protocol to redirect the second subset of packets to a second proxy module integrated within the multi-purpose network protection firewall device; and
 wherein the second transmission protocol is Simple Mail Transfer Protocol (SMTP), Post Office Protocol (POP), Internet Message Access Protocol (IMAP), Hypertext Transfer Protocol (HTTP), File Transfer Protocol (FTP) or telnet protocol.

45. The multi-purpose network protection firewall device of claim 36, wherein the proxy module is operable to filter the buffered portion of the network content.

46. The multi-purpose network protection firewall device of claim 43, wherein the proxy module comprises at least one scanning engine operable to scan the network content distributed among the second subset of packets for malware.

47. The multi-purpose network protection firewall device of claim 43, wherein the proxy module comprises at least one scanning engine operable to scan network content distributed among the second subset of packets for unsolicited advertising in accordance with at least one scanning criterion.

48. The multi-purpose network protection firewall device of claim 43, wherein the proxy module comprises at least one scanning engine operable to scan network content distributed among the second subset of packets for phishing attempts in accordance with at least one scanning criterion.

49. The multi-purpose network protection firewall device of claim 43, wherein the proxy module comprises at least one scanning engine operable to scan network content distributed among the second subset of packets for patterns relating to terrorism or criminal activities in accordance with at least one scanning criterion.

50. The multi-purpose network protection firewall device of claim 43, wherein the proxy module comprises at least one scanning engine operable to detect at least one nonsensical message within network content distributed among the second subset of packets based on a result of a heuristic test for probable stenographic content.

51. The multi-purpose network protection firewall device of claim 36 wherein the proxy module comprises at least one scanning engine operable to scan the buffered portion of network content for at least one word.

52. The multi-purpose network protection firewall device of claim 36, wherein the proxy module further comprises at least one scanning engine operable to scan the buffered portion of the network content in accordance with at least one scanning criterion.

53. The multi-purpose network protection firewall device of claim 52, wherein the proxy module is operable to block content that has been identified during the scanning operation.

54. The multi-purpose network protection firewall device of claim 52, wherein the proxy module is operable to insert an administrative message into content that has been identified during the scanning operation.

55. The multi-purpose network protection firewall device of claim 52, wherein the proxy module is operable to log content that has been identified during the scanning operation.

56. The multi-purpose network protection firewall device of claim 52, wherein the proxy module is operable to alter content that has been identified during the scanning operation.

57. The multi-purpose network protection firewall device of claim 56, wherein the proxy module is operable to mask content that has been identified during the scanning operation.

58. The multi-purpose network protection firewall device of claim 52, wherein the proxy module is operable to drop a network connection associated with content that has been identified during the scanning operation.

59. The multi-purpose network protection firewall device of claim 52, wherein the proxy module is operable to delay content that has been identified during the scanning operation.

60. The multi-purpose network protection firewall device of claim 52, wherein the proxy module is operable to archive content that has been identified during the scanning operation.

61. The multi-purpose network protection firewall device of claim 52, wherein the proxy module is operable to generate at least one alert based on content that has been identified during the scanning operation.

62. The multi-purpose network protection firewall device of claim 52, wherein the proxy module is operable to perform an authentication operation based on content that has been identified during the scanning operation.

63. The multi-purpose network protection firewall device of claim 52, wherein the at least one scanning criterion is selected from a plurality of scanning criteria based on connection information associated with the network content and wherein the connection information comprises at least one of a group consisting of the identified transmission protocol, a source Internet Protocol (IP) address, a destination IP address, an source port number, a destination port number, a source firewall interface, a destination firewall interface, a size of the network content, a date, a time of day and authentication information.

64. The multi-purpose network protection firewall device of claim 52, wherein the at least one scanning criterion is selected from a plurality of scanning criteria based on a data packet information.

65. The multi-purpose network protection firewall device of claim 52, wherein the proxy module is operable to identify phrases in the buffered portion of the network content.

66. The multi-purpose network protection firewall device of claim 52, wherein the proxy module is operable to identify regular expressions in the buffered portion of the network content.

67. The multi-purpose network protection firewall device of claim 52, wherein the proxy module is operable to identify patterns in the buffered portion of the network content.

68. The multi-purpose network protection firewall device of claim 52, wherein the proxy module is operable to determine whether the buffered portion of the network content comprises a link to external content, and, if so, verify the external content.

69. The multi-purpose network protection firewall device of claim 68, wherein the proxy module is operable to check the link against a white list of links or a black list of links.

70. The multi-purpose network protection firewall device of claim 68, wherein the proxy module is operable to send a request to an external server and to authorize the external content based on the request.

71. The multi-purpose network protection firewall device of claim 52, wherein the proxy module is operable to determine whether the buffered portion of the network content comprises an attachment, and, if so, buffer and scan the attachment.

72. The multi-purpose network protection firewall device of claim 36, wherein the proxy module is configured to perform statistical analysis on the buffered portion of the network content.

73. The multi-purpose network protection firewall device of claim 36, wherein the proxy module is configured to perform network usage monitoring in relation to usage by authorized users.

74. The multi-purpose network protection firewall device of claim 36, wherein the proxy module is operable to initiate the processing prior to the completion of the buffering.

75. A non-transitory computer-readable storage medium tangibly embodying one or more sequences of instructions, which when executed by one or more processors of a multi-purpose network protection firewall device, causes the one or more processors to perform a method comprising:
   receiving a plurality of packets formatted in accordance with a plurality of transmission protocols at a first interface of the multi-purpose network protection firewall device;
   identifying a transmission protocol according to which network content distributed among a subset of packets of the plurality of packets is formatted as an instant messaging (IM) protocol;
   using information regarding the identified transmission protocol to redirect the subset of packets to a proxy module integrated within the multi-purpose protection firewall device;
   extracting the network content from the subset of packets and buffering at least a portion of the network content by the proxy module; and
   processing, by the proxy module, the buffered portion of the network content in accordance with the at least one content processing rule selected from a plurality of content processing rules based on the identified transmission protocol;
   identifying a second transmission protocol according to which network content distributed among a second subset of packets of the plurality of packets is formatted;
   using information regarding the identified second transmission protocol to redirect the second subset of packets to a second proxy module integrated within the multi-purpose protection firewall device;
   wherein the second transmission protocol is distinct from the transmission protocol;
   wherein the processing comprises filtering the buffered portion of the network content; and
   wherein the plurality of content processing rules includes one or more content filtering rules.

76. A multi-purpose network protection firewall device comprising:
   a first interface operable to receive a plurality of packets formatted in accordance with a plurality of transmission protocols;
   a proxy means coupled in communication with the first interface for extracting the network content from the subset of packets, buffering at least a portion of the network content, and processing the buffered portion of the network content in accordance with the at least one content processing rule selected from a plurality of content processing rules based on the identified transmission protocol;
   a networking subsystem, coupled in communication with the proxy module, operable to:
   identify a transmission protocol of the plurality of transmission protocols according to which network content distributed among a subset of packets of the plurality of packets is formatted as an instant messaging (IM) protocol, redirect the subset of packets to the proxy module;
   identify a second transmission protocol according to which network content distributed among a second subset of packets of the plurality of packets is formatted; and
   use information regarding the identified second transmission protocol to redirect the second subset of packets to a second proxy module integrated within the multi-purpose network protection firewall device;
   wherein the second transmission protocol is distinct from the transmission protocol;
   wherein the proxy is operable to scan the buffered portion of the network content in accordance with at least one scanning criterion; and
   wherein the plurality of content processing rules includes one or more content filtering rules.

\* \* \* \* \*